United States Patent [19]

Irick

[11] 4,309,039

[45] Jan. 5, 1982

[54] CONTINUOUS SELF-LOCKING SPIRAL WOUND SEAL

[75] Inventor: Stephen C. Irick, Hampton, Va.

[73] Assignee: The United States of America as represented by the Administrator of the National Aeronautics and Space Administration, Washington, D.C.

[21] Appl. No.: 96,257

[22] Filed: Nov. 20, 1979

[51] Int. Cl.³ .............................................. F16J 15/06
[52] U.S. Cl. .......................................... 277/1; 277/2; 277/4; 277/59; 277/72 R; 277/105; 277/204; 285/37; 220/378
[58] Field of Search .................... 277/1, 2, 59, 70, 71, 277/72 R, 105, 106, 201–204, 213–215, 4, 9.5; 285/37; 220/378

[56] References Cited

U.S. PATENT DOCUMENTS

| | | | |
|---|---|---|---|
| 1,527,681 | 2/1925 | Hanson | 277/203 X |
| 2,339,479 | 1/1944 | McCreary | 277/204 X |
| 2,580,546 | 1/1952 | Hobson | 277/204 X |
| 3,057,603 | 10/1962 | Isreeli | 220/378 X |
| 3,093,383 | 6/1963 | Lew | 277/204 X |
| 3,101,953 | 8/1963 | Bosshard | 220/378 X |
| 3,926,445 | 12/1975 | Farnam | 277/204 |
| 4,101,139 | 7/1978 | Nordin | 277/71 X |
| 4,214,761 | 7/1980 | Pippert | 277/204 X |

*Primary Examiner*—Robert S. Ward, Jr.
*Attorney, Agent, or Firm*—Howard J. Osborn; John R. Manning; Wallace J. Nelson

[57] ABSTRACT

A spiral wound seal for effecting a seal between two surfaces. The seal consists of a strip of gasket material wound into a groove machined into one of the surfaces. The gasket strip is wider than the groove is deep such that a portion of the gasket material protrudes from the groove. The seal is effected by clamping the second surface onto the first surface and thereby compressing the protruding gasket material.

14 Claims, 4 Drawing Figures

CONTINUOUS SELF-LOCKING SPIRAL WOUND SEAL

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The present invention relates to a spiral wound seal, and more particularly to such a seal for maintaining a pressure between chambers of a wind tunnel. A pressure seal between chambers of a wind tunnel must meet severe criteria. It must be an active (opened and closed at intervals) large diameter (up to approximately 20 feet) pressure seal for use at cryogenic temperatures. The seal must be effective at clamping pressures between 500 pounds per square inch (psi) and 2,500 psi. It must provide satisfactory sealing in a gaseous environment at temperatures between −320° F. and +200° F. and at pressures up to 130 psi above atmospheric. As a further requirement, because of low accessibility in a wind tunnel to the seal area, the seal must be manufactured in a relatively small size and assembled to its full size in the wind tunnel chamber.

Typically, there are three types of seal gasket configurations: (1) one-piece, (2) segmented and (3) spiral wound. Present one-piece configuration gasket construction is limited to relatively small diameters and construction of such seals of suitable material for cryogenic use is even more limited. Manufacturing capability of large diameter (up to approximately 20 feet) one-piece gaskets of suitable material is nonexistent.

Segmented gaskets with radial joints consist of a number of short segments of gasket material typically with interlocking ends. The pieces fit together to form a large gasket. These types of gaskets are ineffective because of short leak paths at the radial joints.

Construction of present spiral gaskets is limited to relatively small diameters. Typically, unlike the subject invention, they are not single component configurations. Their design requires many parts, complicated machinery for fabrication and a complicated technique for assembly. The construction of spiral wound seals in the prior art consists of inner and outer metal rings along with an intermediate metal spiral strip separating the gasket material in the spiral.

The paraphernalia used to retain the seal material is weighty and sizeable therefore eliminating its use as a practical alternative in some applications. Specifically, this construction prohibits its use in wind tunnel applications because access must be as large as the seal itself and as previously pointed out most wind tunnels do not provide such access. Also, large diameter seals of this construction are ineffective because differences in thermal expansion coefficients and other physical characteristics between the materials induce and accelerate degradation of the seal integrity when the seal is subjected to the severe wind tunnel environment. In the present invention the skived strip of material forms the total gasket. There are no intermediate strips or rings to affect seal performance.

The present invention consists of a single material strip, spiral wound into a groove in one of the sealed surfaces. The strip is wider than the groove is deep and thus protrudes from the surface. The opposing surface contacts and compresses the protruding strip portion to form a seal.

One known type of seal uses a single piece of material cut in the axial direction to form a spiral cut gasket, but this seal is used in a packing box around a shaft and is necessarily subjected to extreme compression from a gland to force the gasket material against the shaft to effect a seal to preclude axial leakage along the shaft.

The strip seal eliminates several design weaknesses of large diameter cryogenic pressure seals. This invention eliminates the necessity of having to fabricate a gasket to its final diameter at the manufacturer and also eliminates the accompanying shipping and storage problems associated with large gaskets. Further, because the gasket is of such a small size before installation, access to the seal location can be small compared to the seal final diameter thus eliminating much overdesign and costs. Therefore, this invention can be utilized at seal sites inaccessible to that of the prior art requiring complete gasket assembly during manufacture.

Inherent in the design of the spiral wound strip seal is the elimination of radial joints of the segmented gasket. In a seal utilizing a segmented gasket with radial joints the potential leak path is directly across the seal. The potential leak path in the strip seal is between the winds of the spirally wound strip and has a length equal to several times the circumference. Thus, in equal circumstances the chance for leakage of the spiral wound strip seal is only a minute fraction of the chance for leakage of a segmented radial joint seal.

Also, directly associated with the failure of seals using segmented gaskets in cryogenic applications is the shrinkage that occurs during the approximately 400° F. temperature reduction. In segmented seals this opens a gap between the segments allowing leakage. In the proposed strip seal the thermal shrinkage tends to tighten the successive winds of the gasket strip upon themselves in the groove thereby enhancing the sealing capability.

The cost of the single strip seal is only a fraction of the cost of the methods used in the prior art. The seal gasket is composed of one component—the gasket material itself.

All intermediate strips, retaining rings, and mandrels for assembly are eliminated. The gasket is skived from a blank on a conventional machine lathe utilizing the two basic functions of the machine, namely; turning and crossfeed. During manufacture there are no additional machine settings or measurements required. There is no material wasted during fabrication. The finished seal is the same size as the original material blank.

Thick one-piece and segmented seals are inherently subject to warpage and damaging stresses. Using the spiral strip concept, a thick seal can be built up without warping because the individual strips are thin and the seal configuration tends to relieve the stresses.

Cutting a cross section through the seal shows the individual winds as columns which bend under a compression load. This configuration conforms to a warped surface better than a solid cross section as is in a one-piece seal or a segmented seal and improves sealing capability at low clamping pressures.

It is an object of the present invention to provide a seal utilizing a single strip spiral wound gasket.

It is another object of the present invention to provide a single strip spiral wound gasket wherein the strip is wound into a groove cut into one of the sealed surfaces.

It is a further object of the present invention to provide a seal utilizing a low cost, easily manufactured spiral wound gasket capable of maintaining seal integrity through severe pressure and temperature gradients.

A further object of the invention is a seal having the foregoing advantages and which holds under either low or high compressive forces.

Another object of the invention is a spiral wound seal with the foregoing advantages wherein a thin strip is wound to form a thick gasket not subject to warpage and damage stresses inherent in one-piece seals.

Other objects and advantages of the present invention will be readily apparent from the following description and drawings which illustrate the preferred embodiments of the invention.

SUMMARY OF THE INVENTION

The present invention involves a spiral wound seal for effecting a seal between two surfaces consisting of a continuous strip of gasket material wound into a groove machined into the first surface. The gasket strip is wider than the groove is deep such that a portion of the gasket material protrudes from the groove. The seal is effected by clamping the second surface onto the first surface and thereby compressing the protruding gasket material.

DESCRIPTION OF THE PREFERRED EMBODIMENT

Figure 2:
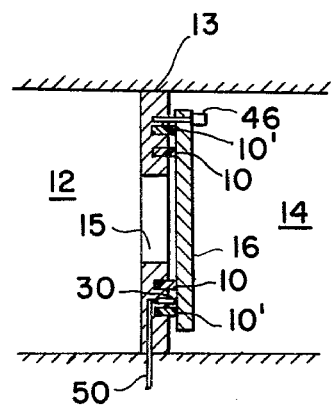
FIG. 2 is a cross sectional view taken along line II—II of FIG. 1.

Refer now to FIG. 2 showing two chambers, 12 and 14 of a wind tunnel 11, separated by a wall 13 and having connecting aperature 15 and gate valve plate 16. Continuous spiral wound gasket strips 10 and 10' form a seal between wall 13 and plate 16 to preclude mixing of the atmospheres of chambers 12 and 14.

The preferred embodiment uses two gaskets, an inner one 10 and an outer one 10'. This double gasket arrangement allows insertion of a pressure tap 50 between the gaskets 10 and 10' at area 30 for detecting leakage. If leakage occurs, pressure builds up quickly between the gaskets and is easily detected.

Figure 1:
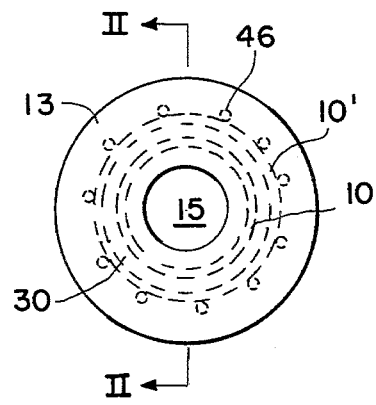
FIG. 1 is an elevational view of a wind tunnel utilizing the invention.

Refer next to FIG. 1 showing wall 13 and strips 10 from chamber 12. Outer gasket 10' completely encircles inner gasket 10 with area 30 lying therebetween. Studs 46 are rigidly attached to wall 13 and extend through plate 16. The studs 46 are used to tighten the plate 16 against the seal to effect the seal.

Figure 4:
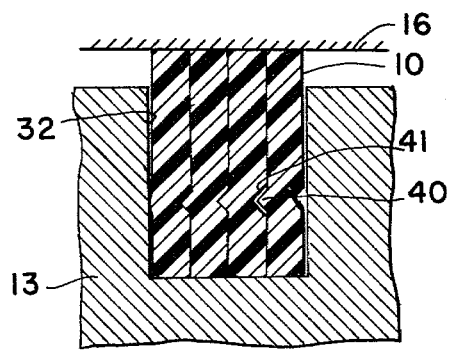
FIG. 4 is a sectional view taken along line IV—IV of FIG. 3.

FIG. 4 shows a cross section of the spiral wound seal of the preferred embodiment. A groove 32 is machined into wall 13 and surrounds aperature 15. In the preferred embodiment gasket strip 10 is made from polytetrafluroethylene filled with twenty-five percent glass fibers. When cut in a strip, this material is flexible, conforms to mating surfaces, and maintains its integrity under clamping pressures in the desired temperature range, $-320°$ F. to $+200°$ F. The material is presently available from Chemplast Inc. Wayne, New Jersey as material number GL25M. Strip 10 is wound into the groove 32 and has a width larger than the depth of groove 32 such that it protrudes therefrom. Mating protrusion 40 and notch 41 on opposite sides of strip 10 run the length of the strip 10 and make adjacent winds self-locking and precludes intermediate winds from being pulled out of the groove under some adverse condition. FIG. 4 shows the individual winds of strip 10 as columns which may bend under a compression load. This configuration conforms to a warped surface better than a solid cross section and improves sealing capability at low clamping pressures.

Sealing is effected by clamping plate 16 toward wall 13. This may be accomplished by any suitable means; nuts 44 and studs 46 (shown in FIG. 1) are utilized in the preferred embodiment of the invention.

Figure 3:
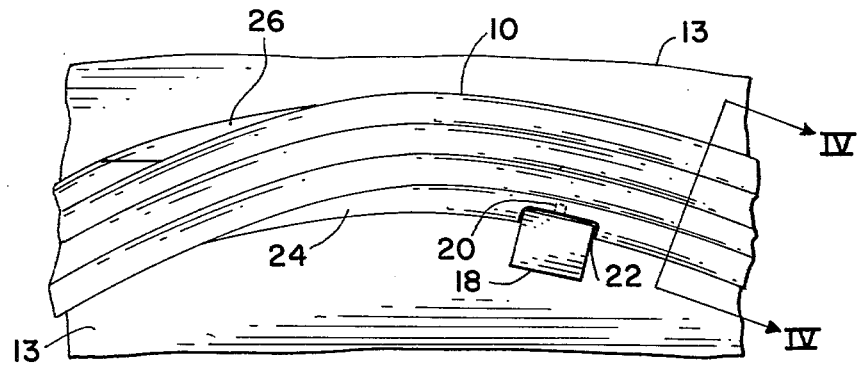
FIG. 3 is a partial elevational view of a spiral wound seal.

FIG. 3 illustrates the winding of strip 10 into groove 32. Strip 10 has a tapered first end 24 minimizing separation of the winding due to the unsupported length of the strip 10 upon passing thereover on the next wind. The wedge 26 provides a restoring force to the tendency of the strip 10 to separate along an unsupported length. Pin 20, shown in phantom, is secured to insert 18 and protrudes into strip 10 to hold and prevent slippage of strip 10 in groove 32 as successive rings are wrapped. Strip 10 has notch 22 to accept insert 18 and is wound around a number of times until groove 32 is filled. Wedge 26, cut from strip 10, is inserted into groove 32 after end 28 of strip 10 to fill any remaining space.

Fabrication of the gasket strip, not depicted in the drawings, may be accomplished as follows. The gasket strip 10 is fabricated from a thin disc of suitable material by skiving (peeling) a continuous strip from the circumference of the disc. The disc is cut from stock of a size sufficient to make a one-piece seal. The disc is prepared by planing both faces parallel to a desired width and finishing them to a suitable smoothness. A conventional lathe is used to turn the circular disc with the crossfeed setting giving the required thickness to the skived strip. The strip is skived with a tool which imparts a notch on one side of the strip and a mating protrusion on the opposite side.

The preferred embodiment utilizes a strip with protrusions 40 and notches 41 on opposing surfaces to mate when installed to preclude the pulling out of a portion of the strip. Alternatively the strip may have flat surfaces or the contact surfaces between the strips may be prepared with an adhesive, making the final assembly a bonded solid piece of material, or the strip may be of tubular construction with ends constructed to allow pressurization after assembly. Large diameter bearings of a suitable material can be constructed in a manner identical to a seal. A thermally controlled seal can be fabricated by imbedding the heater wire in a groove in the strip and wrapping the wire along with the seal strip.

In the preferred embodiment, aperature 15 in wall 13 is circular as are inner seal 10 and outer seal 10'. However, the invention is not limited thusly and any shape aperature or seal may be chosen.

The material used in the preferred embodiment, chosen because of the suitability of its physical properties to wind tunnel applications, is polytetrafluroethylene with 25 percent glass fibers. Alternatively, polytetrafluroethylene alone or compounded with other materials may be used. There are many other forms and types of materials that can be used. Materials preformed into strips are readily usable such as leather, rubber, or metals.

Another application of the spiral wound seal concept is the spiral wound bearing. A strip may be wound as in the preferred embodiment and provide a bearing surface rather than a sealing surface.

The above description and drawings are only illustrative of one embodiment which achieves the objects, features, and advantages of the present invention, and it is not intended that the present invention be limited thereto. Any modification of the present invention which comes within the spirit and scope of the following claims is considered part of the present invention.

What is claimed as new and desired to be secured by Letters Patent of the United States is:

1. A spiral wound seal comprising:
    a first member having a surface with a groove cut therein;
    a second member having a surface adjacent to said first surface;
    a continuous strip of gasket material having a width greater than the depth of said groove, spirally wound into said groove and protruding therefrom; and
    clamping means to hold said second surface against said strip with sufficient force to effect a seal between said first surface and said second surface.

2. A spiral wound seal as in claim 1 wherein:
    said first surface is a wall between two chambers of a wind tunnel having an aperture for communication between the chambers;
    said groove surrounding the aperture; and
    said second surface being a gate valve plate of sufficient size to cover the groove.

3. A spiral wound seal as in claim 1 wherein said strip has a tapered end such that successive winds of said strip over said end experience a minimum deflection.

4. A spiral wound seal as in claim 1 further comprising:
    means for securing said strip to said groove thereby precluding slippage thereof relative to the wall of said groove.

5. A spiral wound seal as in claim 4 further comprising:
    an insert;
    the wall of said groove being recessed to receive said insert;
    said means for securing said strip to said groove being a pin attached to said insert; and
    said insert being rigidly secured in said recess.

6. A spiral wound seal as in claim 1 wherein said said gasket strip is tubular providing a conduit.

7. A spiral wound seal as in claim 1 further comprising:
    at least one segment of gasket material for filling the portion of said groove unfilled by said strip.

8. A spiral wound groove as in claim 1 wherein said groove is rectangular in cross section, and wherein said strip is rectangular in cross section.

9. A spiral wound seal as in claim 1 wherein said strip has a protrusion and a mating notch such that said notch and said protrusion of successive winds mate.

10. A spiral wound seal as in claim 1 further comprising:
    a second groove cut in said first surface and surrounding said groove;
    a continuous second strip of gasket material having a width greater that the depth of said second groove, spirally wound into said second groove and protruding therefrom; and
    said clamping means holding said second surface against said first strip and said second strip with sufficient force to effect a seal therebetween.

11. A spiral wound seal as in claim 1 wherein said clamping means comprises a plurality of threaded studs protruding from said first member through said second member and threaded nuts turned on said stubs to tighten said second member against said gasket material.

12. A method of forming a seal comprising:
    providing a first surface having a groove;
    providing a second surface adjacent to said first surface;
    providing a strip of gasket material having a width greater than the depth of said groove;
    spirally winding said strip into said groove;
    providing clamping means to engage said second surface against said strip and said strip against said first surface between said strip and said second surface; and
    applying sufficient force to said strip to effect a seal between said first and second surfaces.

13. A spiral wound seal as in claim 10 further comprising:
    a pressure probe disposed to monitor the pressure between an annulus formed between said gasket strip and said second gasket strip.

14. A spiral wound seal as in claim 1 wherein said strip of gasket material is polytetrafluroethylene embedded with glass fibers.

* * * * *